US007419033B2

(12) United States Patent
Ito

(10) Patent No.: US 7,419,033 B2
(45) Date of Patent: Sep. 2, 2008

(54) EMERGENCY BRAKE DEVICE FOR ELEVATOR

(75) Inventor: Kazumasa Ito, Tokyo (JP)

(73) Assignee: Mitsubishiki Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/565,970

(22) PCT Filed: Jun. 14, 2004

(86) PCT No.: PCT/JP2004/008651

§ 371 (c)(1),
(2), (4) Date: Nov. 13, 2006

(87) PCT Pub. No.: WO2005/121006

PCT Pub. Date: Dec. 22, 2005

(65) Prior Publication Data

US 2007/0089937 A1 Apr. 26, 2007

(51) Int. Cl.
*B66B 11/08* (2006.01)
*B66B 5/00* (2006.01)
*B66B 5/16* (2006.01)
*B60T 13/04* (2006.01)

(52) U.S. Cl. ....................... 187/351; 187/254; 187/350; 188/171; 188/173

(58) Field of Classification Search ................. 187/350, 187/351; 188/161, 163, 171, 173
See application file for complete search history.

(56) References Cited

U.S. PATENT DOCUMENTS 4,287,551 A * 9/1981 Watanabe ................... 361/212
4,739,969 A * 4/1988 Eckersley et al. ........... 254/378
5,007,505 A 4/1991 Lindegger
7,080,717 B2 * 7/2006 Ito ............................. 187/350
2004/0262091 A1 * 12/2004 Ito ............................. 187/372

FOREIGN PATENT DOCUMENTS

| | | |
|---|---|---|
| JP | 2-106590 | 4/1990 |
| JP | 5-193860 | 8/1993 |
| JP | 6-199483 | 7/1994 |
| JP | 10-203761 | 8/1998 |
| JP | 10203761 A * | 8/1998 |
| JP | 2002-106611 | 4/2002 |
| JP | 2002-241064 | 8/2002 |
| JP | 2002-267578 | 9/2002 |
| WO | WO 03008317 A1 * | 1/2003 |
| WO | 03/089354 | 10/2003 |

* cited by examiner

*Primary Examiner*—Peter M. Cuomo
*Assistant Examiner*—Eric Pico
(74) *Attorney, Agent, or Firm*—Oblon, Spivak, McClelland, Maier & Neustadt, P.C.

(57) ABSTRACT

An emergency brake device for an elevator includes a brake shoe portion provided inside a sheave 1 or deflector sheave of an elevator and having a brake shoe 5*a* at a lower end of the brake shoe portion, the brake shoe generating a braking force due to friction upon abutting an inner wall of an outer peripheral frame of the sheave or deflector sheave at a time of braking, the brake shoe portion having built therein spring mechanisms 51, 52 provided between the brake shoe and king pins 5*f*1, 5*f*2, which are offset in a rotation direction of the sheave or deflector sheave with respect to a centerline passing through a rotation shaft of the sheave or deflector sheave and are fixed on a bearing 1*b* side of the rotation shaft, the spring mechanisms each absorbing a force generated between the brake shoe and the king pin due to the braking force and being connected to the king pin at one end.

9 Claims, 5 Drawing Sheets

EMERGENCY BRAKE DEVICE FOR ELEVATOR

TECHNICAL FIELD

The present invention relates to an emergency brake device for an elevator.

BACKGROUND ART

Conventionally, there are emergency brake devices in which an emergency stop or a speed governor is disposed on the counterweight side or which are provided with a rope brake that directly grips a main rope for cases where a car moves upwards at a speed higher than a rated speed due to a failure or accident in an elevator, due to an unbalance in weight between the elevator car and a counterweight, or the like.

Further, JP 5-193860 A discloses an emergency brake device having a braking bolt inserted between the spokes mounted to the shaft of the drive sheave.

Further, JP 6-199483 A discloses a brake device that stops a deflector sheave by pushing a wedge-like braking member between the sheave or the deflector sheave and the pressing member.

Further, JP 2002-241064 A discloses an emergency stop device in which wedge-like clamps are inserted on both sides of a car guide rail and braking is applied by sandwiching the guide rail from the both sides.

However, each of the conventional emergency brake devices as described above requires a space dedicated for the provision of the brake device and is rather complex in structure. Further, with the emergency brake device in which the braking bolt is inserted between the spokes, there is a time lag between the engagement of the braking bolt with the spokes and the generation of a braking force, so there is a problem in that the speed of the car increases during this time lag. Further, with the device in which the wedge-like braking member or clamp is inserted, no mechanism is provided for releasing the mechanical engagement of the inserted braking member or clamp to enable a restart. Further, with the device provided with the rope brake that directly grips the main rope or the device in which the guide rail is sandwiched from both sides, there is a problem in that damage is caused to the rope or the guide rail.

It is an object of the present invention to provide an emergency brake device for an elevator which does not require a dedicated installation space, is simple in structure, allows easy releasing of a braking force, and does not cause damage to a rope or guide rail of the elevator.

DISCLOSURE OF THE INVENTION

In view of the above-mentioned object, the present invention provides an emergency brake device for an elevator, characterized by including a brake shoe portion provided inside a sheave or deflector sheave of an elevator and having a brake shoe at a lower end of the brake shoe portion, the brake shoe generating a braking force due to friction upon abutting an inner wall of an outer peripheral frame of the sheave or deflector sheave at a time of braking, the brake shoe portion having built therein a spring mechanism provided between the brake shoe and a king pin, which is offset in a rotation direction of the sheave or deflector sheave with respect to a centerline passing through a rotation shaft of the sheave or deflector sheave and is fixed on a bearing side of the rotation shaft, the spring mechanism absorbing a force generated between the brake shoe and the king pin due to the braking force and being connected to the king pin at one end.

BEST MODE FOR CARRYING OUT THE INVENTION

Hereinbelow, embodiments of the present invention will be described with reference to the drawings.

Embodiment 1

Figure 1:
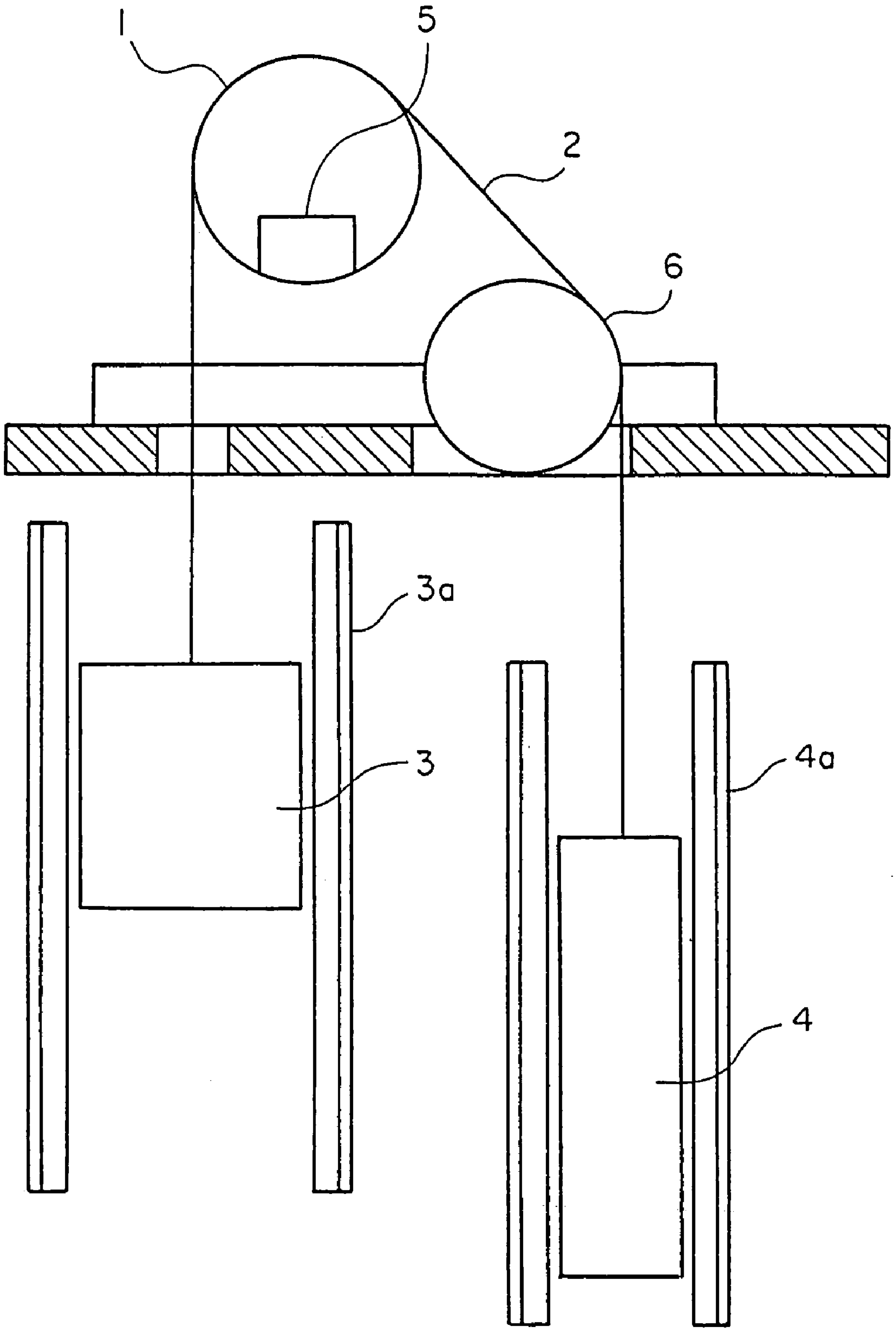
FIG. 1 is a view showing the construction of a traction type elevator apparatus equipped with an emergency brake device for an elevator according to the present invention.

FIG. 1 is a view showing the construction of a traction type elevator apparatus equipped with an emergency brake device for an elevator according to the present invention. In the traction type elevator apparatus, a car 3 and a counterweight 4, which are respectively raised and lowered along guide rails 3*a*, 4*a* within a hoistway, are connected with each other by a wire rope 2 and the wire rope 2 is wound around a hoisting machine sheave 1 and a deflector sheave 6 in the manner of a pulley, the car 3 being driven by utilizing the friction force between the wire rope 2 and the hoisting machine sheave 1. An emergency brake 5 according to the present invention is provided, for example, inside the sheave 1.

Figure 2:
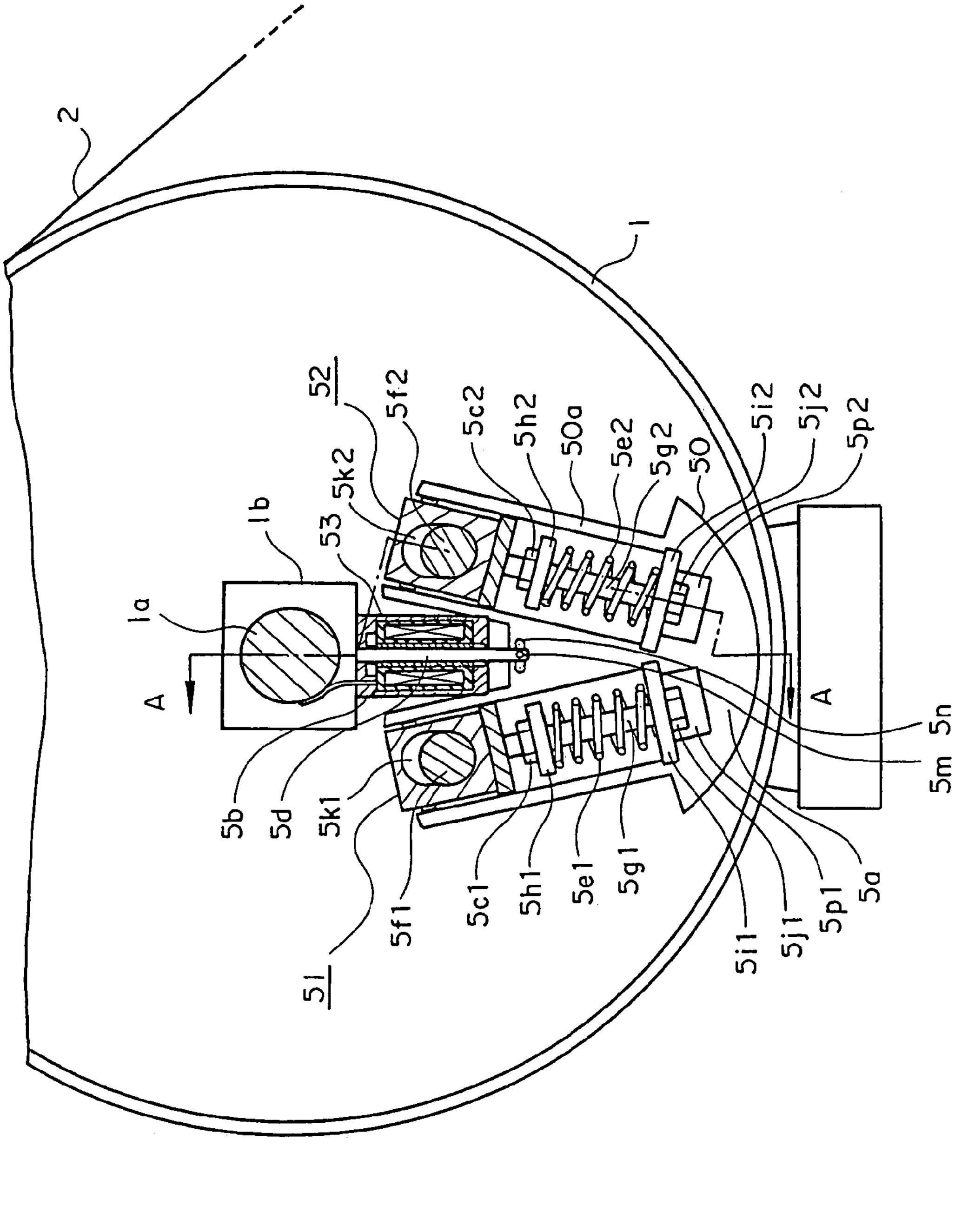
FIG. 2 is a perspective view, partly in section, of an emergency brake when not in operation, showing an example of an emergency brake according to the present invention provided inside a sheave.
Figure 3:
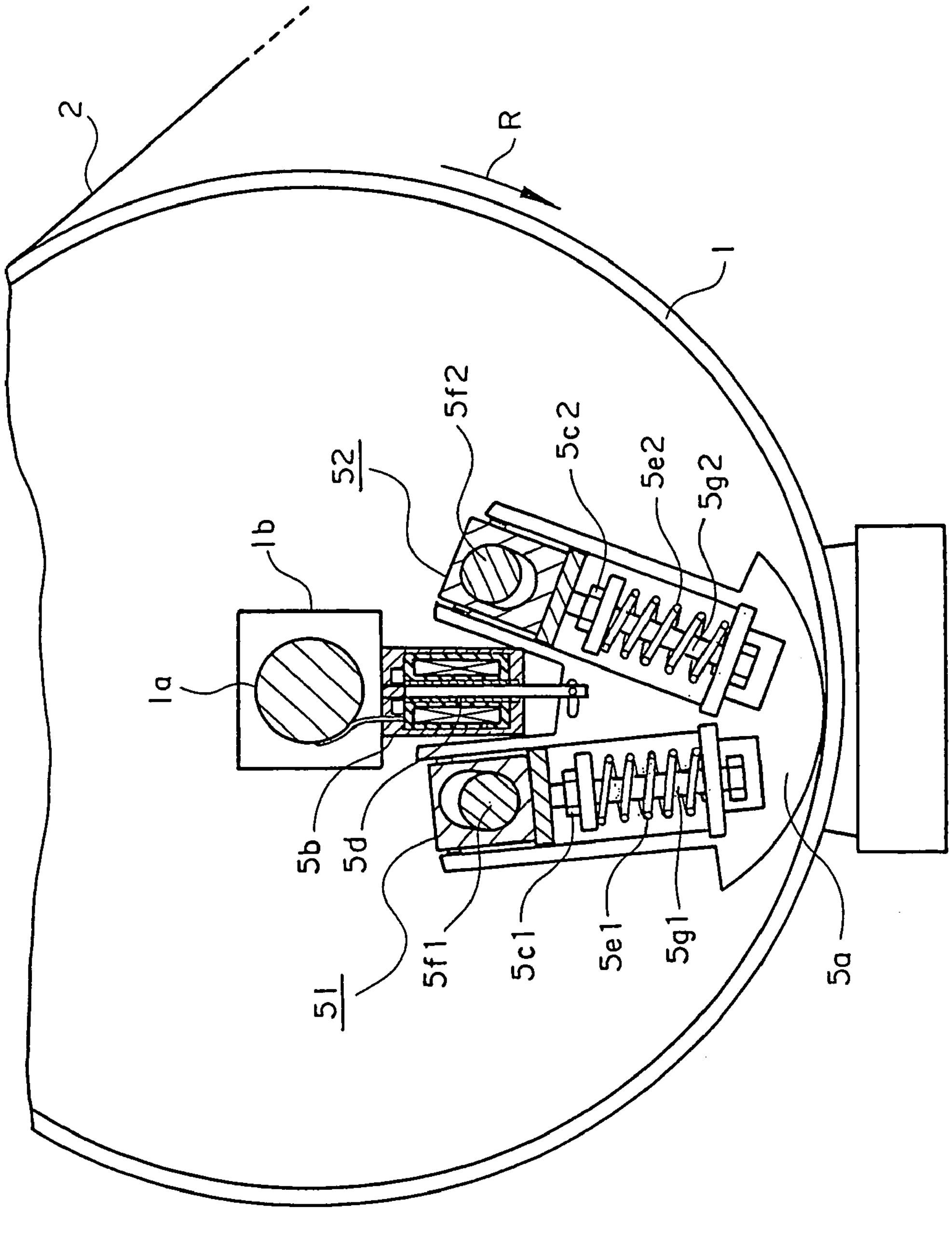
FIG. 3 is a perspective view, partly in section, of the emergency brake of FIG. 2 when in operation.
Figure 4:
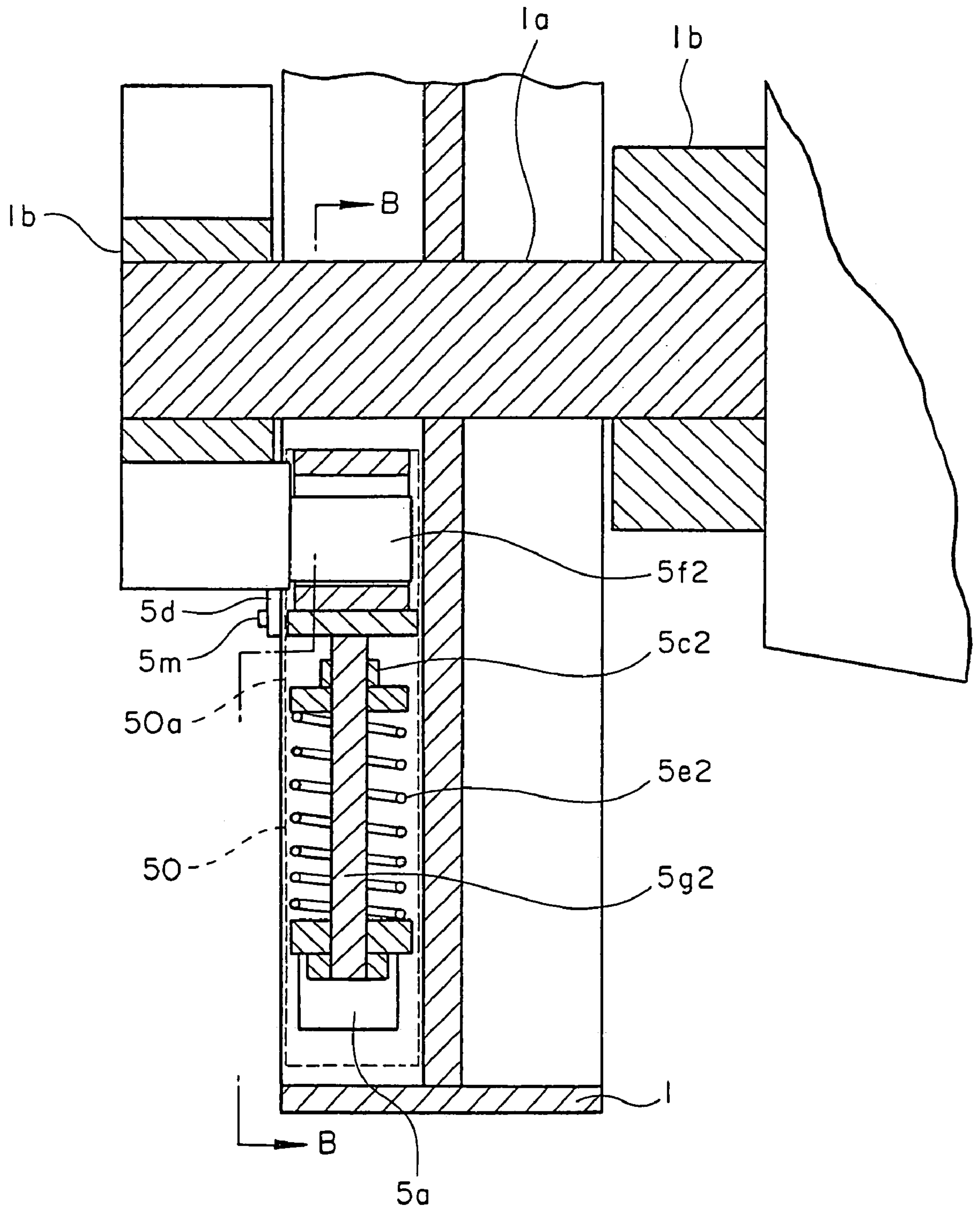
FIG. 4 is a perspective side view, partly in section, of the emergency brake of FIG. 2 when not in operation.

FIG. 2 through FIG. 4 are perspective views, partly in section, showing an example of the emergency brake 5 provided inside the sheave 1. FIG. 2 and FIG. 3 are views basically along the line B-B of FIG. 4, respectively showing the emergency brake 5 when in operation and when not in operation. FIG. 4 is a view basically taken along the line A-A of FIG, 2, showing the emergency brake 5 when not in operation. It should be noted that reference symbols of only major components are shown in FIG. 3, FIG. 4 for the ease of understanding the overall construction. Referring to the drawings, the emergency brake 5 is composed of a brake shoe portion 50 provided with a pair of spring mechanisms 51, 52, and a drive portion 53 for moving (raising and lowering) the brake shoe portion 50 between a position where the brake shoe portion 50 is spaced from the inner wall of the outer peripheral frame of the sheave 1 and a position where the brake shoe portion 50 abuts the inner wall of the outer peripheral frame.

The brake shoe portion 50 has, inside a main body portion 50*a* thereof, the pair of spring mechanisms 51, 52 that are arranged, within the surface of revolution of the sheave 1, in an upwardly open V-shaped configuration on both sides of the longitudinal centerline of the main body portion 50*a* in the state where the portion of the brake shoe 5*a* which abuts the inner wall of the outer peripheral frame (inner side of the outer peripheral surface) of the sheave 1 faces downwards. The spring mechanisms 51, 52 are of the same construction and are provided with compression coil springs 5$e$1, 5$e$2 with bolts 5$g$1, 5$g$2 serving as their shafts, respectively. Movable wedge portions 5$i$l, 5$i$2, and adjusting wedge portions 5$h$1, 5$h$2 are provided on the lower and upper sides of the coil springs 5$e$1, 5$e$2, respectively. A1

The movable wedge portions 5$i$1, 5$i$2 are fixed to the main body portion 50$a$; when, as shown in FIG. 3, the main body portion 50$a$ undergoes tilting (in actuality, such tilting includes minute lateral displacement) to stop the rotation of the sheave 1 when the emergency brake 5 is in operation, the movable wedge portions 5$i$1, 5$i$2 make relative upward movement along the bolts 5$g$1, 5$g$2 against the stress exerted by the coil springs 5$e$1, 5$e$2. Accordingly, gaps 5$p$1, 5$p$2 are formed such that fixing nuts 5$j$1, 5$j$2, which are respectively provided at the lower ends of the bolts 5$g$1, 5$g$2 to prevent the dislodging of the bolts 5$g$1, 5$g$2 from the movable wedge portions 5$i$1, 5$i$2, can move downwards with respect to the movable wedge portions 5$i$1, 5$i$2, respectively. The adjusting wedge portions 5$h$1, 5$h$2 are adjusted in their vertical positions by adjusting nuts 5$c$1, 5$cb$ in order to adjust the stress exerted by the coil springs 5$e$1, 5$e$2, respectively. In the normal state, the coil springs 5$e$1, 5$e$2 are in the state of initial compression by means of the adjusting wedge portions 5$h$1, 5$h$2 and the adjusting nuts 5$c$1, 5$cb$, respectively, thus exerting an initial pressing force.

Provided at the respective upper ends of the spring mechanisms 51, 52 are movable support holes 5$k$1, 5$k$2 to be fitted with king pins 5$f$1, 5$f$2 fixed to a bearing 1$b$ of a rotation shaft 1$a$ (see the bearing on the left-hand side of FIG. 4) of the sheave 1.

Further, like the king pins 5$f$1, 5$f$2, the drive portion 53, which is shown in cross section in FIGS. 2, 3 for the description of its inner structure, is fixed to the bearing 1$b$ of the rotation shaft 1$a$ (see the bearing on the left-hand side of FIG. 4) of the sheave 1. The drive portion 53 is equipped with a solenoid coil 5$b$, and a plunger 5$d$ that is driven through the turning on and off of electric current to the solenoid coil 5$b$. A pin 5$m$ for connection with the brake shoe portion 50 is provide at the lower end of the plunger 5$d$. When the pin 5$m$ is fitted in a movable support hole 5$n$ formed in the main body 50$a$ of the brake shoe portion 50, this effects the connection with the brake shoe portion 50, thereby driving the brake shoe portion 50. That is, the brake shoe portion 50 is moved between the position as shown in FIG. 2 where it is spaced from the inner wall of the sheave 1 and the position as shown in FIG. 3 where it abuts the inner wall of the sheave 1, while being suspended by the pin 5$m$ at the lower end of the plunger 5$d$. Thus, according to the configurations of the movable support holes 5$k$1, 5$k$2 and movable support hole 5$n$ which will be describe later, the brake shoe portion 50 is capable of tilting by a predetermined angle to both sides with respect to the vertical centerline passing through the rotation shaft 1$a$.

The (first) movable support holes 5$k$1, 5$k$2 at the upper ends of the spring mechanisms 51, 52, and the (second) movable support hole 5$n$ of the brake shoe portion 50, are formed as elongated circular holes so as to allow the movement of the brake shoe portion 50 between the position as shown in FIG. 2 with the emergency brake 5 not in operation and the position as shown in FIG. 3 with the emergency brake 5 in operation. Although FIG. 3 shows the state where the sheave 1 rotates in the clockwise direction as indicated by the arrow R, the configurations of the movable support holes 5$k$1, 5$k$2 and of the movable support hole 5$n$ are determined by also taking into consideration the case where the sheave 1 rotates in the counterclockwise direction reverse to the clockwise direction of FIG. 3.

Figure 5:
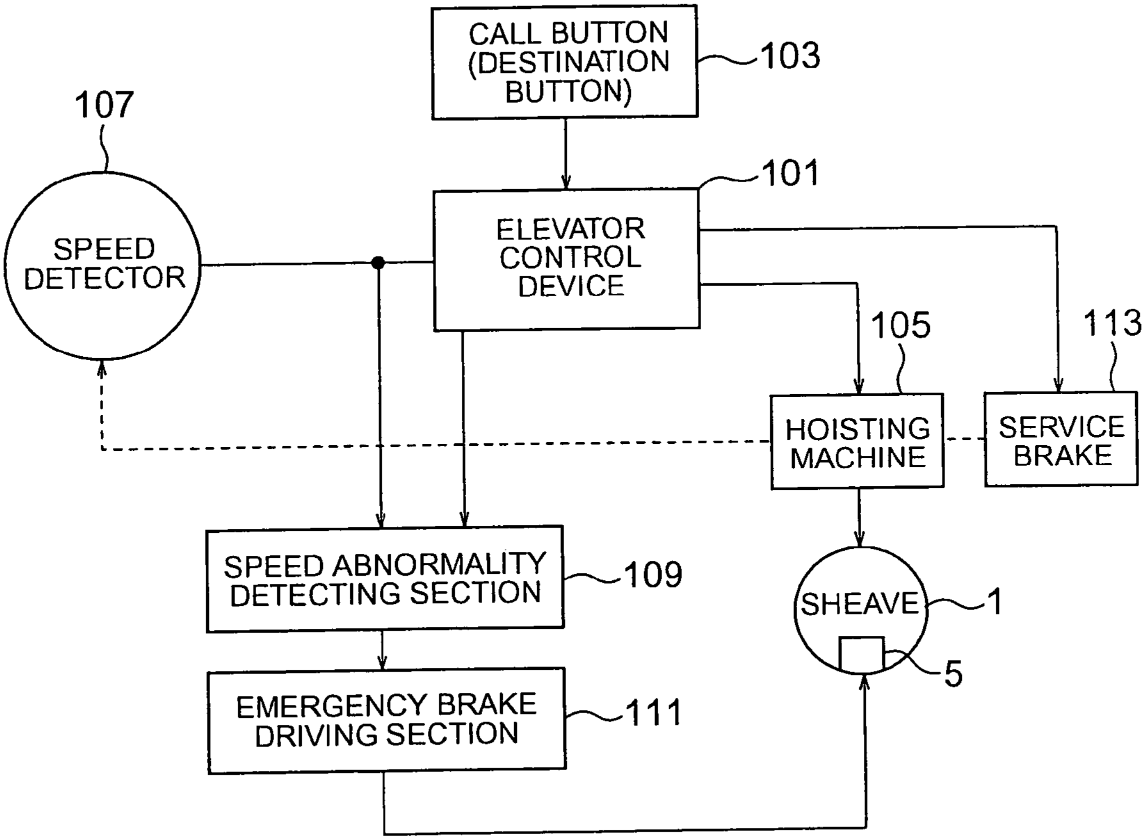
FIG. 5 is a diagram showing the schematic configuration of an elevator control system including an emergency brake device according to the present invention.

FIG. 5 shows the schematic configuration of an elevator control system including the emergency brake device according to the present invention. Normally, when a passenger operates a call button installed in the landing or a destination button 103 installed within the car, an elevator control device 101 releases a service brake 113, and a hoisting machine 105 is driven to rotate the sheave 1, thereby raising and lowering the car 3 to carry the passenger. At this time, a speed detector 107 provided to the hoisting machine 105 performs feedback control on the raising and lowering speed. When the car 3 arrives at the target floor, the rotation of the hoisting machine 105 is stopped, and then the service brake 113 is activated to lock the rotation of the hoisting machine 105.

Then, by obtaining from the elevator control device 101 the status of a control command to the car 3, a speed abnormality detecting section 109 monitors whether or not a speed abnormality (including an abnormality in the traveling direction) is occurring through checking of the actual behaviors (speed and orientation) of the car at that time by obtaining in the form of a detection signal from the speed detector 107 the rotation state of the hoisting machine 105. Upon finding the occurrence of a speed abnormality, such as when the car 3 is moving upwards at a speed higher than a rated speed or when the car 3 starts moving upwards or downwards even though the command signal indicates stoppage, the speed abnormality detecting section 109 instructs emergency brake driving section 111 to drive the emergency brake 5.

The emergency brake driving section 111, which has continuously supplied electric current to the solenoid coil 5$b$ of the drive portion 53 of the emergency brake 5, cuts off the electric current supply. As a result, the brake shoe portion 50, which has been pulled up by the drive portion 53 as shown in FIG. 2, moves down to the position as shown in FIG. 3 where the brake shoe 5$a$ at a lower portion of the brake shoe portion 50 abuts the inner wall of the outer peripheral frame of the sheave 1. Provided that, as shown in FIG. 3, the sheave 1 is rotating clockwise as indicated by the arrow R, the spring mechanism 51 is thus sandwiched between its abutting portion with the inner wall of the sheave 1 of the brake shoe 5$a$ and the king pin 5$f$1, so the brake shoe 5$a$ is pressed against the inner wall of the shave 1 by the spring force of the coil spring 5$e$1, thereby stopping or preventing the rotation of the sheave 1.

It should be noted that the speed abnormality detecting section 109 and the emergency brake driving section 111 may be incorporated into the elevator control device 101 composed of a computer or the like together with other control functions.

That is, when, for example, the car 3 of the elevator moves, for example, in the upward direction at a speed higher than a rated speed, the speed abnormality detecting section 109 senses the abnormal speed, so the emergency brake driving section 111 cuts off the supply of electric current to the solenoid coil 5$b$. Accordingly, the brake shoe portion 50 is lowered by gravity so the brake shoe 5$a$ provided at its lower portion is pressed against the sheave 1; as the sheave 1 rotates, the brake shoe portion 50, particularly its portion on the spring mechanism 51 side, is caught in between the sheave 1 and the king pin 5$f$1 due to the wedge effect and moves until equilibrium is reached between the spring force of the coil spring 5$e$1 and the braking force generated by the brake shoe 5$a$. In this way, the coil spring 5$e$1 undergoes further compression by a predetermined amount from its normal compression state to generate a fixed pressing force, whereby a braking force is generated between the brake shoe 5$a$ and the sheave 1. Accordingly, the car 3 that is moving upwards is decelerated and stopped with a fixed braking force irrespective of the speed of the car 3.

It should be noted that while the foregoing description is directed to the case where the car 3 moves upwards, the same operation and effect can be achieved in the case where the car 3 moves downwards as well, because the structure of the emergency brake 5 is symmetrical on the right and left sides of its centerline. Further, while in the foregoing description an abnormal speed of the car 3 traveling in the upward direction is sensed and the car is stopped, it is also possible, by abutting the brake shoe 5*a* against the inner wall of the sheave 1 while the car 3 is at rest, to prevent an abnormal ascent or descent of the car 3 not only when the car moves at an abnormal speed but also when the passengers get on or off the elevator while the car is at rest.

Further, the same effect as described above can be attained also when the emergency brake 5 is mounted in the deflector sheave 6 instead of in the hoisting machine sheave 1.

INDUSTRIAL APPLICABILITY

The emergency brake according to the present invention is applicable not only to elevators but also to various rotary apparatuses to achieve the same enhanced safety as described above.

The invention claimed is:

1. An emergency brake device for an elevator comprising:

a brake shoe portion provided inside one of a sheave and a deflector sheave of an elevator and having a brake shoe at a lower end of the brake shoe portion, the brake shoe generating a braking force due to friction upon abutting an inner wall of an outer peripheral frame of one of the sheave and the deflector sheave at a time of braking, the brake shoe portion tilting at the time of braking by the braking force, the brake shoe portion having built therein a spring mechanism provided between the brake shoe and a king pin, the king pin extending along an axis that is offset with respect to a centerline passing through a rotation shaft of one of the sheave and the deflector sheave, and the king pin is fixed to a bearing of the rotation shaft, the spring mechanism having a first end movably supported by the king pin and a second end connected to the brake shoe, and the spring mechanism absorbing a force generated between the brake shoe and the king pin due to the braking force, the spring mechanism comprising:

a compression coil spring pressing the brake shoe toward the sheave at the time of braking and a block which receives the compression force of the compression coil spring and which has a support hole in the form of a slot, the support hole being sized, shaped, and positioned to receive the king pin.

2. An emergency brake device for an elevator comprising a sheave mounted on a shaft, said emergency brake device comprising:

(a) a bearing mounted on the shaft, the bearing having two king pins projecting therefrom;

(b) a brake shoe portion provided inside the sheave, the brake shoe portion having:

(i) a main body portion tilting at a time of braking by a braking force;

(ii) a brake shoe at an end of the main body portion; and (iii) a first support hole in the form of a first slot having a first end and a second end;

(c) a pair of spring mechanisms in an open V-shaped configuration on either side of the longitudinal centerline of the main body portion, each of the pair of spring mechanisms comprising:

(i) a compression coil spring pressing the brake shoe toward the inner wall of the sheave at the time of braking and (ii) a block which receives the compression force of the compression coil spring and which has a second support hole in the form of a second slot having a first end and a second end, the second support hole being sized, shaped, and positioned to receive one of the two king pins;

(d) a drive portion for moving the brake shoe portion between a position where the brake shoe is spaced from the inner wall of the sheave and a position in which the brake shoe abuts the inner wall of the sheave, generating a braking force, said drive portion comprising:

(i) a solenoid coil;

(ii) a plunger driven by the turning on and off of electrical current to the solenoid coil;

(iii) a pin connected to the brake shoe portion provided at one end of the plunger, the pin being sized, shaped, and positioned to be received in the first support hole;

whereby:

(e) when the sheave is rotating about the shaft in a first direction and the drive portion has moved the brake shoe into abutment with the inner wall of the sheave, a first one of the two king pins, is received in the first end of the second support hole, a second one of the two king pins is received in the second end of the first support hole, and the pin is received in the first end of the first support hole, tilting the brake shoe portion in a first direction relative to the longitudinal centerline of the main body portion, and (f) when the sheave is rotating about the shaft in a second direction, opposite to the first direction, and the drive portion has moved the brake shoe into abutment with the inner wall of the sheave, the first one of the two king pins is received in the second end of the first support hole, the second one of the two king pins is received in the first end of the first support hole, and the pin is received in the second and of the first support hole, tilting the brake shoe portion in a second direction, opposite to the first direction, relative to the longitudinal centerline of the main body portion.

3. The emergency brake device for an elevator according to claim 2 wherein the sheave is a hoisting machine sheave.

4. The emergency brake device for an elevator according to claim 2 wherein the sheave is a deflector sheave.

5. The emergency brake device for an elevator according to claim 2 wherein the end of the brake shoe portion is its lower end.

6. The emergency brake device for an elevator according to claim 2 wherein the first support hole in the form of a slot is composed of half circles at either end joined by straight lines.

7. The emergency brake device for an elevator according to claim 2 wherein the second support hole in the form of a slot is composed of half circles at either end joined by straight sides.

8. The emergency brake device for an elevator according to claim 2 wherein the end of the plunger on which the pin is provided is the distal end.

9. The emergency brake device for an elevator according to claim 2 wherein the compression force of the compression coil springs varies as the brake shoe portion is tilted relative to the longitudinal centerline of the main body portion.

* * * * *

UNITED STATES PATENT AND TRADEMARK OFFICE

CERTIFICATE OF CORRECTION

PATENT NO. : 7,419,033 B2
APPLICATION NO. : 10/565970
DATED : September 2, 2008
INVENTOR(S) : Ito It is certified that error appears in the above-identified patent and that said Letters Patent is hereby corrected as shown below:

On the title page, Item (73), the Assignee information is incorrect. Item (73) should read:

-- (73) Assignee: Mitsubishi Denki Kabushiki Kaisha,
Tokyo (JP) --

Signed and Sealed this

Fourth Day of November, 2008

Jon W. Dudas

JON W. DUDAS
*Director of the United States Patent and Trademark Office*